United States Patent [19]

Aizawa

[11] Patent Number: 4,754,975
[45] Date of Patent: Jul. 5, 1988

[54] IRON CLUB HEAD

[75] Inventor: Yuichi Aizawa, Tokyo, Japan

[73] Assignee: Daiwa Golf Co., Ltd., Tokyo, Japan

[21] Appl. No.: 63,238

[22] Filed: Jun. 17, 1987

[30] Foreign Application Priority Data

Jun. 20, 1986 [JP] Japan .............................. 61-94394[U]

[51] Int. Cl.⁴ ............................................. A63B 53/04
[52] U.S. Cl. .................................. 273/169; 273/175; 73/12
[58] Field of Search ....................... 273/167 J, 78, 169, 273/170, 171, 172, 173, 174, 175

[56] References Cited

U.S. PATENT DOCUMENTS 3,266,805  8/1966  Bulla ............................... 273/169 X
4,630,826 12/1986  Nishigaki et al. ............... 273/169 X
4,697,814 10/1987  Yamada ............................... 273/169

Primary Examiner—George J. Marlo
Attorney, Agent, or Firm—Kalish & Gilster

[57] ABSTRACT

An iron club head which comprises a core body having a core portion, a sole portion, and a hosel portion. The core portion is formed with a front or club face at the predetermined inclination and includes a ball impacting portion. An inner layer of non-metallic fiber reinforced synthetic resin is laminated with an outer layer of metallic woven fabric reinforced synthetic resin and are provided coveringly on said core portion. The inner layer is constituted of a first layer which comprises non-oriented fiber reinforced synthetic resin which includes a thermosetting resin impregnated into non-metallic fiber bundles. The inner layer also contains a second layer which is constituted of non-metallic woven fabric reinforced synthetic resin with a thermosetting resin impregnated thereinto. The outer layer is integrated with fiber in which a thermosetting resin is impregnated. The woven fabric may be of any suitable weave, such as long shaft, plain or the like.

20 Claims, 5 Drawing Sheets

IRON CLUB HEAD

BACKGROUND OF THE INVENTION

1. Field of the Invention

This invention relates in general to iron golf club heads, and more particularly to an iron club head having a club face and related portions made from a fiber reinforced synthetic resin.

2. Description of the Prior Art

Recently, an iron club head of the type having a club face and related portions made from a synthetic resin reinforced with non-metallic fiber, such as carbon and glass or the like, has been developed, as shown in, for example, Japanese Utilization Publication No. 17883/1978 or Japanese Utilization Laid-Open No. 16670/1984. The above iron club head comprises a sole portion and adjacent to it a hosel portion, both of which are made from stainless steel or other metal, and a metallic core material of plate-like or other form is disposed vertically so as to make the sole portion an integral part thereof; the core material portion being formed integrally with the fiber reinforced synthetic resin which forms the club face portion of the club head, the toe portion, the top portion and the back portion.

Such a club head has superior impact resilience thanks to its fiber reinforced synthetic resin and this superior impact resilience lengthens the ball driving distance, while at the same ensuring that the impact at the time of hitting a ball is as soft as that experienced with a wooden club and that ball control is easy. As a result, direction control is easier than it is with an iron club made only from metal.

There is, however, a problem with the above iron club in that the surface of the synthetic resin tends to be easily worn and broken because the carbon fiber or glass fiber is mainly used as a reinforcing fiber for the synthetic resin which forms the club face and related portions of the iron club head; that is, the surface of the club face of the club head wears and dents to form a crater after it has been used repeatedly to hit balls. These dents lead to a loss of ball control. Another problem is a failure to produce back spin because of the slippage which occurs on impact causing the ball to stop at the target point is a case where the scoring lines cut on the surface of the club face disappear. Particularly in the case of a short iron club which tends to be used with a high degree of back spin and in locations where there is much earth and sand, wear of the surface of the club face increases even further. When the club head is driven into sand on a fairway bunker when attempting to hit a ball, or when a ball is hit in an overgrown place such as the "rough", a groove portion forming the scoring lines on the surface of the club face and a hem portion of the club head are liable to be broken, or the surface of the club face may be easily damaged if the club head unintentionally hits or touches a stone or rock or the like in the sand or the "rough". Furthermore the impact which occurs when club heads strike each other during storage in golfbag or during transport can lead, for example, to the top portion, the toe portion and related portions thereof being damaged.

An object of the present invention is to provide an iron golf club head which is capable of overcoming the above problems, wherein wear resistance of the surface of the club face, which is made of synthetic resin, is improved and the surface is made to be such that it will be resistant to breakage.

DESCRIPTION OF PRACTICAL EMBODIMENTS

Figure 1:
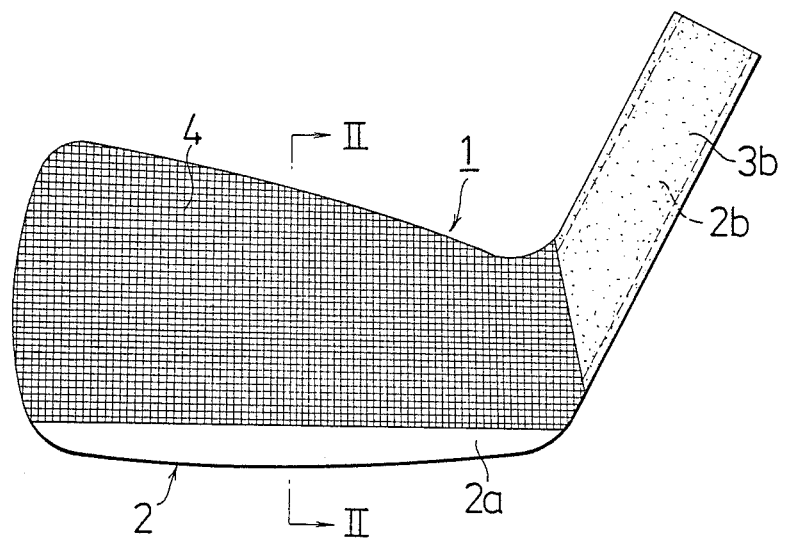
FIG. 1 is a front view showing a first embodiment of an iron golf club head constructed in accordance with and embodying the present invention.

Referring now by reference characters drawings, which illustrate practical embodiments of the present invention reference numeral 1 indicates an iron golf club head having a core body 2 which is integrally formed from metallic materials such as stainless steel, soft iron or the like. A non-metallic fiber reinforced synthetic resin layer 3 is disposed coatingly over said core portions other than the sole portion 2a, and a metallic fiber woven fabric reinforced synthetic resin layer 4 is laminated on the outer side of the non-metallic fiber reinforced synthetic resin layer 3.

The core body 2 comprises a sole portion 2a, a hosel portion 2b provided adjacent the heel side of sole portion 2a and a core portion 2c formed vertically above sole portion 2a and located adjacent hosel portion 2b. Core portion 2c is inclined in accordance with the loft angle of the particular club number. The portion of core body 2 connecting sole portion 2a to hosel portion 2b is provided with a plurality of spaced supporting columns 2d, with window openings 2e provided therebetween. (FIG. 3).

The non-metallic fiber reinforced synthetic resin layer 3 consists of a first or inner layer 3a covering hosel portion 2b of core body 2 and core portion 2c of the club face, and a second or outer layer 3b covering first layer 3a.

Figure 3:
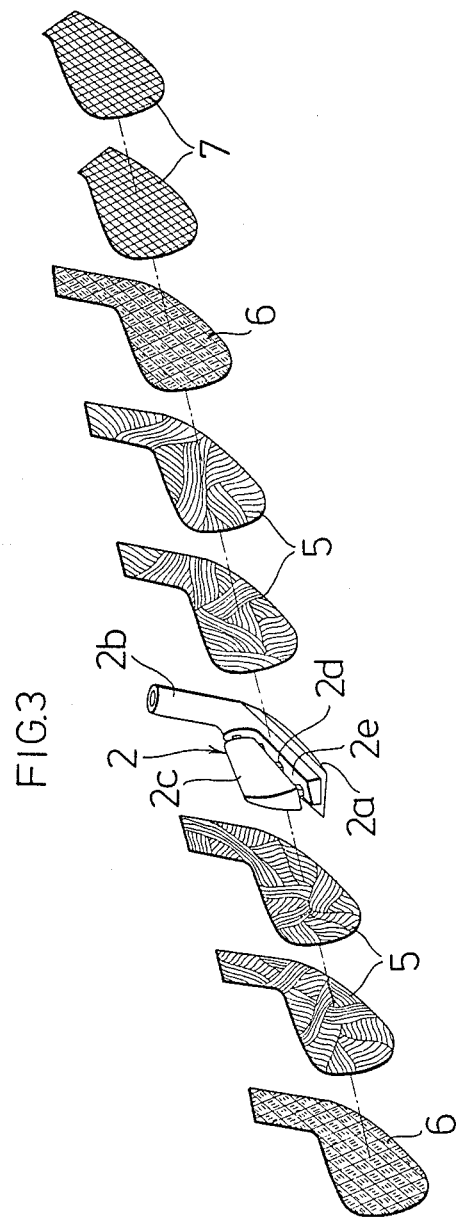
FIG. 3 is an exploded perspective view showing each of the constituent elements of an iron golf club head according to the present invention.

Said first layer 3a, as shown in FIG. 3, consists of two laminated sheets 5 of a non-oriented fiber reinforced synthetic resin (substantially 1 mm in thickness) wherein thermosetting synthetic resin is impregnated into non-metallic fiber bundles which are formed from a non-metallic type of fibers such as carbon, glass or the like, the fibers being arranged without orientation. The integration of the first layer 3a with the core body 2 is carried out by laminating two non-oriented fiber reinforced synthetic resin sheets 5 on the front face and the rear face of core body 2. The second or outer layer 3b consists of, as shown in FIG. 3, woven fabric fiber reinforced synthetic resin sheet 6 (substantially 0.3 mm in thickness) wherein a thermosetting synthetic resin is impregnated into a woven fabric which is made of a non-metallic fiber such as carbon or glass or the like. This woven fabric fiber reinforced synthetic resin sheet 6 is laminated to the outer surface of the non-oriented fiber synthetic resin sheet so as to form the second layer 3b.

The above metallic fiber woven fabric reinforced synthetic resin layer 4 consists, as shown in FIG. 3, of laminating two metallic fiber woven fabric reinforced synthetic resin sheets 7 (substantially 0.3 mm in thickness) in which a thermosetting synthetic resin such as epoxy resin or vinylester or the like is impregnated into a woven fabric consisting of a metallic fiber made of such material as stainless steel or amorphous material such as nickel ferrous cobalt, or other amorphous metal fibers*. The diameter of the amorphous material is substantially 8 micro M. This metallic fiber woven fabric reinforced synthetic resin sheet 7 is laminated on the outer surface of the woven fabric fiber reinforced synthetic resin sheet 6 on the front surface of core body 2b.

* such as identified by the trademark UNITIKA of Unitike Ltd.

Figure 4:
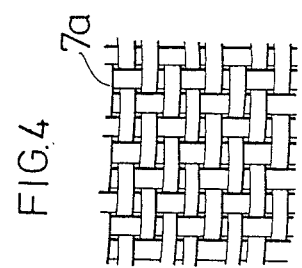
FIGS. 4, 5 and 6 are enlarged fragmentary planar views illustrating various examples of the metal fiber woven fabrics incorporated in club heads according to the present invention.
Figure 5:
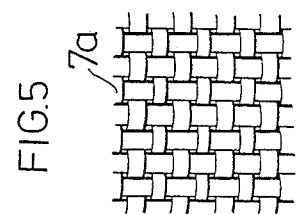
Figure 6:
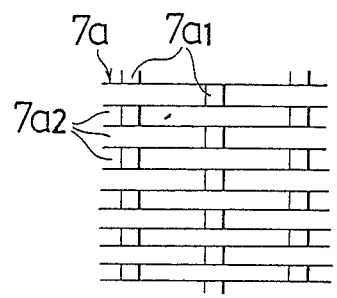

A metallic fiber woven fabric 7a which forms the above metallic fiber woven fabric reinforced synthetic resin sheet 7 is exemplified as a long shaft weave fabric as shown in FIG. 4, as a plain weave fabric as shown in FIG. 5, and as a plain weave fabric in which the number of fabric bundles is, as shown in FIG. 6, different between warp fiber bundles $7a_1$ and weft fiber bundles $7a_2$. The number of fibers per bundles of metallic fibers used in the above woven fabric is, for example, three thousand twisted yarns wherein the diameter of each strand of yarn is substantially 0.3 mm and the diameter of the metallic fiber is substantially $7\mu$.

Figure 2:
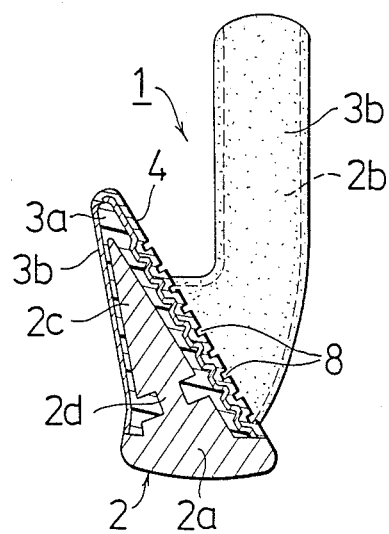
FIG. 2 is a vertical transverse sectional view taken on the line II—II of FIG. 1.

In the metallic fiber reinforced synthetic resins, although the proportion of the metallic fiber to the synthetic resin, volumetrically, is substantially 30%, it may be varied within the range of between 10 and 70%. When an iron club head is formed using sheets 5, 6 and 7, the structure of each of which is described above, the sheets 5, 6 and 7 are arranged as shown in FIG. 3 around the core body 2 and set in the cavity of a compression molding machine for effecting thermosetting to integrate the sheets with the core body 2 in the form shown in FIGS. 1 and 2. The window opening 2e in the core body 2 is filled with the non-oriented fiber reinforced synthetic resin, and the scoring lines 8 are formed on the surface of the metallic fiber woven fabric reinforced synthetic resin layer 4. Then a coating such as urethane or the like (thickness substantially 0.05 mm) is applied after forming the non-metallic fiber reinforced synthetic resin layer 3 and metallic fiber reinforced synthetic resin layer 4 prior to completion of the finished product.

In the above embodiment, because the surface of the club face and hems of the toe portion and the top portion of the iron club head are formed with the metallic fiber woven fabric reinforced synthetic resin layer 4, wear of the surface of the club face is greatly decreased compared with a conventional club head made from carbon fiber or glass fiber reinforced synthetic resin. As a result, the prior art problems of deterioration of performance such as loss of ball control, eradicating through usage scoring lines 8 which will lead to a decrease in the ability to produce a ball spinning, and in ball slippage are all prevented.

Because of the coverage with a woven fabric-like metallic fiber on the surface of the club face, the surface of the club face is formed uniformly so as to cause stable contact on impact. Moreover, the metallic fiber woven fabric can be introduced into all corners of the mold due to the flexibility when the club head is compression molded. As a result, the synthetic resin is free from any risk of gathering in the groove portion of the scoring lines on the surface of the club face and at the hem portion of the club head portion. Consequently ease of breakage of the groove portions of score lines 8 on the surface of the club face and the club head hem portion is prevented in the event the club head strikes a stone or a rock when driven into the earth or sand prior to its impacts with a ball, as in a fairway bunker or overgrown area such as the "rough".

Furthermore, breakage or cracks which are caused when clubs collide with each other when stored or carried in a golf bag can also be prevented.

The result of a wear resistance test carried out on the surface of the club face of an iron club head will now be described.

Figure 7:
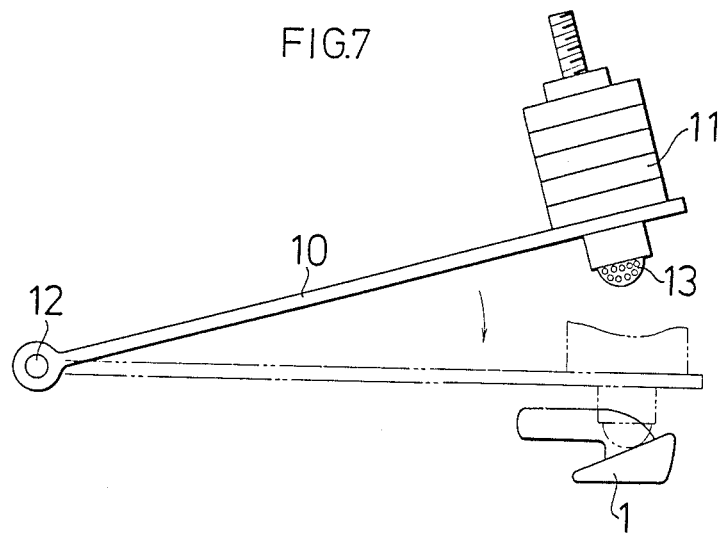
FIG. 7 is a side view of an abrasion tester constructed in accordance with and embodying the present invention showing the same in lowered or operative position in phantom lines.

FIG. 7 illustrates a wear resistance test machine for testing the surface of a club face, wherein reference numeral 10 represents an arm, one end of which is pivotally engaged on a shaft 12, and the outer or opposite end of which carries a weight 11 of predetermined amount (11 Kg). A golf ball 13 is suitably secured on the lower surface of arm 10 at the outer end thereof. An iron club head 1 is located at the position where the golf ball 13 is dropped to receive the impact provided with the aid of the weight 11.

A suitable amount of sand coats the surface of the presented club face of club head 1, and ball 13 is brought downwardly on such surface of club head 1 by rocking arm 10 to effectively drop weight 11 freely through a distance of 280 mm for the purpose of testing the wear resistance of the surface of the club face.

Figure 8:
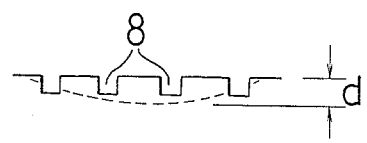
FIG. 8 is a fragmentary sectional view illustrating the degree of abrasion of the surface of the club head face.
Figure 9:
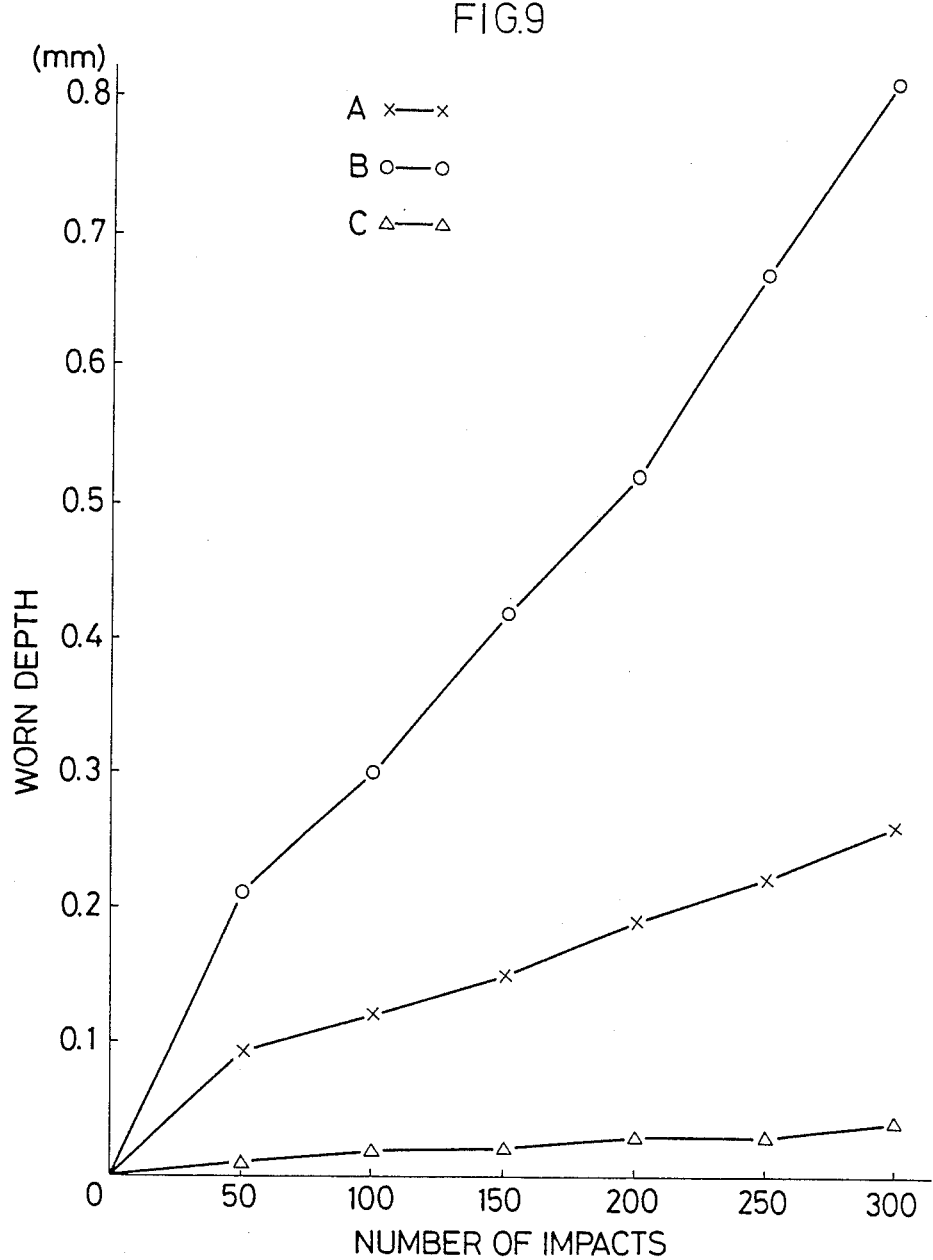
FIG. 9 is a graph illustrating the comparative results of an abrasion test for the club head according to the present invention and for a conventional club head.

Table 1 below shows the result of measurement of worn depth d at the impacted point on the club face (see FIG. 8); a measurement being made after every 50 strokes using a high-depth gauge. FIG. 9 is a graph showing such relationship wherein the broken line A joining marks x shows the results of the wear test on the surface of the club face of the iron club head according to the present invention. (The surface of the club face is made from stainless steel (SUS304) fiber woven fabric reinforced synthetic resin.) The broken line B which joins the marks o shows the results of a wear test on the surface of the club face of a conventional club head made from a so-called carbon iron. (The surface of the club face is made from a carbon fiber woven fabric reinforced synthetic resin.) It is apparent, as shown in the characteristics curve, that the worn depth of the surface of the club face of the iron club head, constituted in accordance with the present invention, is greatly decreased compared with that of the conventional one.

Thus, a club head wherein the surface of the club face is formed with a metallic fiber woven fabric reinforced synthetic resin can display superior wear resistance. The broken line C joining the marks Δ shows the result of a wear test on the wear depth of the club face of the metallic iron club made from stainless steel (SUS304). It is apparent that wear resistance of the iron club head according to the present invention displayed is similar to that of the conventional metallic iron club head.

TABLE 1

| Sample | No. of Impacts | | | | | | |
|---|---|---|---|---|---|---|---|
| | 0 | 50 | 100 | 150 | 200 | 250 | 300 |
| A | 0 | 0.09 | 0.12 | 0.15 | 0.19 | 0.22 | 0.26 |
| B | 0 | 0.21 | 0.30 | 0.42 | 0.52 | 0.67 | 0.81 |
| C | 0 | 0.01 | 0.02 | 0.02 | 0.03 | 0.03 | 0.04 |

(Note) Each sample shows the mean of the results of testing three test pieces. (unit: mm)

Figure 10:
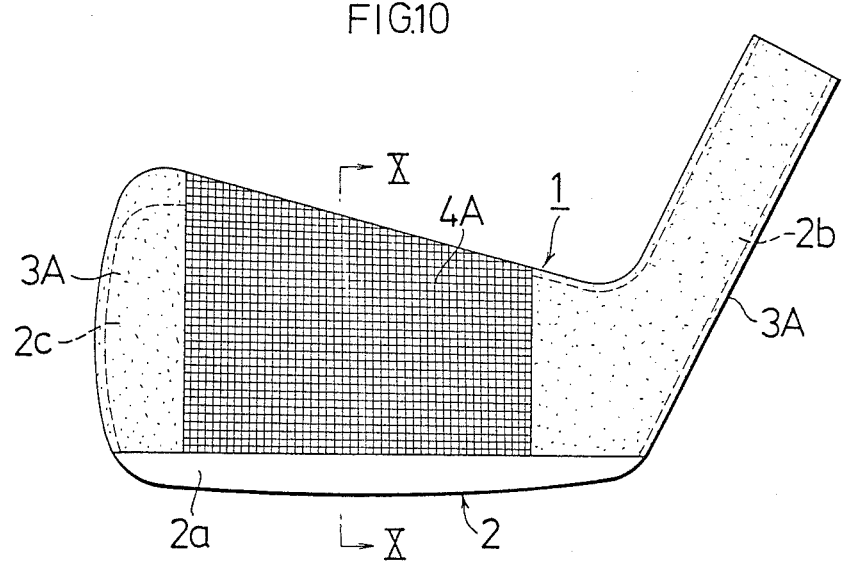
FIG. 10 is a front view of second embodiment of an iron golf club head constructed in accordance with and embodying the present invention.
Figure 11:
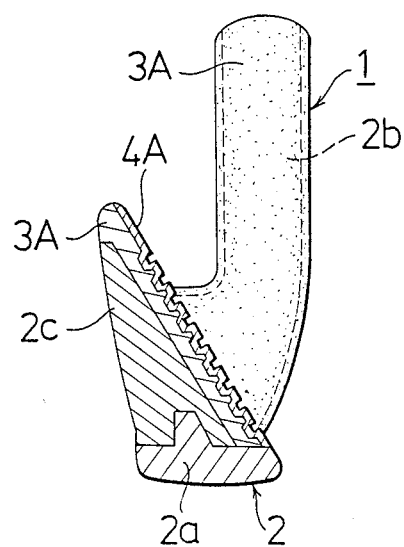
FIG. 11 is a vertical transverse sectional view taken on the line X—X of FIG 10.

FIGS. 10 and 11 show a second embodiment of an iron club head constructed according to the present invention. The differences between same and the first embodiment are that sole portion 2a and hosel portion 2b forming core body 2 are integrally formed with a stainless steel or other metal, and that core portion 2c for the club face is formed with ceramics or other weight, such as a weight block, which is different from the material of the above described sole portion 2a and related parts; and is secured to sole portion 2a that the front portion of the surface of the club face and hosel portion 2b of core body 2 are covered with a non-metallic fiber reinforced synthetic resin layer 3A, and that only the scoring line portion of the club face is covered with a metallic fiber woven fabric reinforced synthetic resin layer 4A. Wear resistance also improved in this embodiment as with the above first embodiment.

Although in these embodiments the metallic fiber woven fabric reinforced synthetic resin layer is provided over the entirety of the club face of the club head or scoring line portion, it may alternatively be formed over the portions formed of synthetic resin.

Although the metallic fiber woven fabric reinforced synthetic resin layer described in connection with the above embodiment is formed of a metallic fiber woven fabric comprising a mixture of a metallic fiber such as stainless steel or the like and a non-metallic fiber such as carbon fiber or glass fiber or the like may also be employed as described below.

Non-metallic fiber bundles such as carbon fiber or glass fiber bundles may be used to replace the metallic fiber woven fabric in either the warp or weft, wherein, for example, the warp is made of carbon fiber and the weft is made of stainless steel fiber to make a plain woven fabric. This embodiment is particularly preferable because stainless steel fiber bundles in the scoring line direction can be introduced into all corners of a mold. This facilitates formation of the scoring lines due to employment of carbon fiber bundles which is more flexible than the stainless steel bundles in the direction perpendicular to the scoring lines.

A woven fabric wherein the fiber bundles are partially mixed with non-metallic fibers such as carbon or glass fiber in place of a metallic fiber woven fabric may be employed.

A woven fabric which is a mixture of a multiple of independent metallic fiber bundles and independent carbon fiber bundles or glass fiber bundles or the like which together form a woven fabric may be employed in place of a metallic fiber woven fabric, wherein, for example, a woven fabric in which warp and weft is alternatively made form a metallic fiber bundle and a non-metallic fiber bundle may also be employed.

The ball impacting portion of a club head is improved not only in wear resistance but also in terms of strength against breakage due to the formation of a woven fabric reinforced synthetic resin layer such as stainless steel or the like or a mixture of a metallic fiber such as stainless steel or the like or a mixture of a metallic fiber such as stainless steel or the like and a non-metallic fiber such as carbon or glass, which is applied in addition to a non-metallic fiber reinforced synthetic resin layer at least inside the ball impacting zone on the front of the core body of the club head.

What is claimed:

1. An iron golf club head comprising a core body consisting of a sole portion, a core portion, and a hosel portion, said core portion having a front face defining a club face of predetermined inclination, an inner layer of a non-metallic fiber reinforced synthetic resin provided on said core portion, and an outer layer of metallic fiber woven fabric reinforced synthetic resin provided on said inner layer, said inner and outer layers being integrally formed.

2. An iron golf club head as defined in claim 1 wherein said inner and outer layers are provided on said hosel portion.

3. An iron golf club head as defined in claim 1 wherein said inner layer comprises a first layer of non-oriented fiber reinforced synthetic resin and a second layer of woven fabric fiber reinforced synthetic resin, said second layer being laminated to the outer surface of said first layer.

4. An iron golf club head as defined in claim 3 wherein said non-oriented fiber reinforced synthetic resin of said inner first layer comprises a thermosetting resin and non-metallic fiber bundles, said resin being impregnated in said bundles.

5. An iron golf club head as defined in claim 4 wherein the fibers of the non-metallic fiber bundles of said inner first layer are from the class consisting of carbon and glass.

6. An iron golf club head as defined in claim 3 wherein the second layer of said inner layer comprises a thermosetting resin and a non-metallic woven fabric reinforced synthetic resin, said thermosetting resin and said non-metallic woven fabric being integrated.

7. An iron golf club head as defined in claim 1 wherein said outer layer comprises a thermosetting resin and a woven fabric of metallic fiber, said resin being impregnated into said woven fabric.

8. An iron golf club head as defined in claim 7 wherein the thermosetting resin of the outer layer is from the class consisting of epoxy resin and vinylester.

9. An iron golf club head as defined in claim 8 wherein the metallic fiber of the outer layer is from the class consisting of stainless steel and amorphous metal fibers.

10. An iron golf club head as defined in claim 7 wherein the woven fabric of metallic fiber is of long shaft weave.

11. An iron golf club head as defined in claim 7 wherein the woven fabric of metallic fiber is of plain weave.

12. An iron golf club head as defined in claim 7 wherein the impregnated woven fabric comprises warps of carbon fiber and wefts of stainless steel.

13. An iron golf club head comprising a core consisting of a core portion, a sole portion, and a hosel portion, said sole portion and hosel portion being formed of metallic material, said core portion being formed of rigid material and having a front or club face with a ball impacting portion, a first layer provided on said core portion for covering said ball impacting surface comprising non-metallic fiber reinforced synthetic resin and a second layer comprising woven fabric reinforced synthetic resin consisting of a mixture of metallic and non-metallic fibers, said first and second layers being integrated.

14. An iron golf club head as defined in claim 13 wherein said core portion is metallic.

15. An iron golf club head as defined in claim 13 wherein said core portion is non-metallic.

16. An iron golf club head as defined in claim 13 wherein the second layer mixture includes a thermosetting synthetic resin from the class consisting of epoxy resin and vinylester, impregnated into a plain woven fabric of the fibers with the warps formed of a plurality of carbon fibers and the wefts formed of a plurality of metallic fibers from the class consisting of stainless steel and amorphous metal fibers.

17. An iron golf club head as defined in claim 13 wherein the non-metallic fibers are partially mixed with the metallic fibers.

18. An iron golf club head as defined in claim 13 wherein the second layer is a mixture of independent non-metallic fiber bundles and independent metallic fibers bundles, there being a thermosetting resin impregnated into said mixture.

19. An iron golf club head as defined in claim 13 wherein said first layer comprises a thermosetting resin, said non-metallic fibers being in bundles, said non-metallic fibers being non-oriented and from the class consisting of carbon fiber and glass fiber.

20. An iron golf club head as defined in claim 13 wherein said first layer is providing coveringly on the outer surface of the core portion and said hosel portion.

* * * * *